(12) United States Patent
Finger, II

(10) Patent No.: US 7,039,631 B1
(45) Date of Patent: May 2, 2006

(54) SYSTEM AND METHOD FOR PROVIDING SEARCH RESULTS WITH CONFIGURABLE SCORING FORMULA

(75) Inventor: James Charles Finger, II, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 10/155,769

(22) Filed: May 24, 2002

(51) Int. Cl.
*G06F 17/30* (2006.01)

(52) U.S. Cl. .............................................. 707/3; 707/4
(58) Field of Classification Search .............. 707/1–10, 707/100–104.1; 706/45
See application file for complete search history.

(56) References Cited

U.S. PATENT DOCUMENTS

| | | | | |
|---|---|---|---|---|
| 5,870,740 | A * | 2/1999 | Rose et al. ..................... | 707/5 |
| 6,009,422 | A * | 12/1999 | Ciccarelli ...................... | 707/4 |
| 6,182,072 | B1 | 1/2001 | Leak et al. .................... | 707/10 |
| 6,334,131 | B1 | 12/2001 | Chakrabarti et al. .......... | 707/10 |
| 6,651,057 | B1 * | 11/2003 | Jin et al. ........................ | 707/5 |
| 6,701,305 | B1 * | 3/2004 | Holt et al. ..................... | 706/45 |
| 6,718,324 | B1 * | 4/2004 | Edlund et al. ................. | 707/5 |
| 6,721,737 | B1 * | 4/2004 | Iyengar et al. ................. | 707/5 |
| 6,738,764 | B1 * | 5/2004 | Mao et al. ..................... | 705/5 |
| 6,766,316 | B1 * | 7/2004 | Caudill et al. ................. | 707/3 |

OTHER PUBLICATIONS

Lawrence, S. et al., "Context and page analysis for improved Web search", *IEEE Internet Computing*, 1998, 2(4), 38-46.

* cited by examiner

*Primary Examiner*—Jeffrey Gaffin
*Assistant Examiner*—Yicun Wu
(74) *Attorney, Agent, or Firm*—Woodcock Washburn LLP

(57) ABSTRACT

A system and method for scoring documents in a search, wherein the scoring algorithm may be reconfigured dynamically. When a query is submitted, a score data structure is created for each document to be scored, which contains fields of information about how a given document compares to a query. A ranker object embodies a formula that derives a scalar score from the information contained in a score data structure. Scoring software is configured to apply the formula embodied in a ranker object to the values in the score data structure. Thus, the scoring formula can be dynamically changed without recompiling the scoring software by providing a new ranker object. Preferably, ranker objects are organized into rank sets, where each rank set contains a different ranker object for each class of document to be scored.

14 Claims, 7 Drawing Sheets

600

| FIELD | VALUE |
|---|---|
| 602 — perfect | 1 |
| 604 — rarity - index | 3 |
| 606 — nonstop words | 2 |
| 608 — stop words | 0 |
| 610 — stems | 1 |
| 612 — synonyms | 1 |

FIG. 6

Score = 0.85 x perfect + 0.5 x stopwords... ⟵ 700

| main | |
|---|---|
| document class | formula |
| site | nonstopwords - 0.1 * stopwords + .... |
| sold-sites | nonstopwords - 0.5 * stopwords + .... |
| . . . | . . . |

820

| beta | |
|---|---|
| document class | formula |
| site | nonstopword - 0.2 * stopword + ... |
| Sold - sites | nonstopword + 0.15 perfect + ... |
| . . . | . . . |

*FIG. 8*

SYSTEM AND METHOD FOR PROVIDING SEARCH RESULTS WITH CONFIGURABLE SCORING FORMULA

FIELD OF THE INVENTION

The present invention relates generally to the field of computing and, more particularly, to a system and method for scoring documents in order to provide search results.

BACKGROUND OF THE INVENTION

The goal of a document search is to take a query, compare the query to a set of known documents, and determine which documents best match the query. The quality of a match—i.e., the decision as to how well a document matches a query—is generally determined by giving each document a "score." The score is a number that indicates how well the document matches the query.

Scores are typically computed as follows. Given a query, a database is searched that contains information about known documents. For each document that matches the query in some respect (e.g., each document that has at least a word in common with the query), a score data structure is created, which contains a list of values. Each value represents some aspect of how the document compares to the query (e.g., number of nonstopwords matched, whether the exact query phrase is found in the document, whether the matching of query words in the document required "stemming" (i.e., removing "-ing" or "-ed"), etc.). A scalar value called the "score" is created from the information contained in the score data structure. It is possible to compare these two scalar scores and, thus, to determine which document, from among several documents, is the best match. Search results are typically provided in order of the document scores. Thus, the document with the highest score is listed first in the results (since, if the scoring method has done its job, that document should be the best match with the query), the next document list is the document with the second highest score, and so on.

The creation of a scalar score from a score data structure is performed by applying a formula to the information in the score data structure. For example, if the score data structure contains the number of nonstopwords matched, and the aggregate rarity index of each word matched, then a scalar score can be computed using the formula:

$$\text{score} = 0.85 * \text{nonstopwords} + 0.65 * \text{rarity\_index}.$$

In this example, 0.85 and 0.65 are arbitrary constants to be multiplied by values in the score data structure. ("Nonstopwords" generally include those words that are of significance in distinguishing one document from another. "Nonstopwords" are in contradistinction from "stopwords," which generally include very common words such as "and," "the," "a," etc. What constitutes a "stopword" or a "nonstopword" in a given search system is a choice made by the system's designers.)

To describe the above example in greater generality, if the score data structure contain n values numbered 0 through n−1, then the score may be computed by the formula:

$$\text{score} = c_0 v_0 + \ldots + c_{n-1} v_{n-1}$$

where $v_1 \ldots v_{n-1}$ are the values in the score data structure, and $c_1 \ldots c_{n-1}$ are the respective constants by which those values are to be multiplied by to arrive at the score. The constants $c_1 \ldots c_{n-1}$ essentially represent a judgment about the relative importance of each value in arriving at the score.

In a typical system, the formula that is used to compute the score from the score data structure is hard-coded into the scoring software. Thus, in order to change the formula used to compute the score, the scoring software must be rewritten and recompiled. Thus, it is difficult for existing scoring software to accommodate changes in the way that scores are computed, or tests of new scoring strategies. Some such existing scoring software also has the disadvantage that permitting any changes to the scoring formula requires that the operator of the scoring software have access to the source code and the ability to recompile it. This arrangement may give broader access to the source code than the source code's owner might desire, and also has the disadvantage that encouraging frequent modifications to the source code—no matter how minor—creates the opportunity to introduce errors and bugs into the code. Other systems can be "trained" and thus do not require recompiling in order to change the formula; however, the training process is generally slow, and therefore expensive in terms of machine time.

In view of the foregoing, there is a need for a system that overcomes the drawbacks of the prior art.

SUMMARY OF THE INVENTION

The present invention provides a technique for scoring documents in order to provide search results, where the actual scoring formula can be dynamically configured—i.e., without a change to the scoring software. In order to conduct a search, a user provides a query, and a known universe of documents (e.g., web pages, etc.) is compared to the query. The results of this comparison are collected in a score data structure, which contains various fields of raw data indicating various different aspects of how the document compares to the query. A score data structure is created for each document (or, at least, for each document that meets some minimum comparison criterion, such as having at least one term in common with the query). A score (i.e., a scalar value indicating overall how well a given document matches the query) is computed based on the information contained in the score data structure.

The invention provides means for dynamically changing the formula that is used to compute the scalar score from the score data structure. Each formula that can be applied to a score data structure is embodied in a "ranker object." A scoring system according to the invention applies a ranker object to a score data structure in a manner such that new ranker objects can be created and applied at run time. Thus, the formula that computes a score can be changed without recompiling the software that implements the scoring system by creating a new ranker object that embodies a new formula.

In a preferred embodiment, ranker objects are organized into "rank sets." Each rank set contains one or more ranker objects, wherein each ranker object is associated with a particular "document class." A "document class" is a category of documents, and each document to be searched preferably has an assigned document class. Different scoring formulas can be applied to different documents depending on what document class the document falls into. For example, a document may belong either to the class "site" (i.e., run-of-the-mill web sites) or "sold-site" (i.e., web sites that the search engine operator has been paid to direct users to), and the scoring formula for "sold-site" documents may be designed to produce generally higher scores in order to skew the rankings in favor of these sites. Thus, a single rank set may contain a first ranker object for documents of class "site," and a second ranker object for documents of class "sold-site." When the scoring system is called upon to score the documents using the defined rank set, the scoring system looks up, for each document, which class the document is in, and then applies the relevant ranker object for that document class.

Preferably, a scoring system has at its disposal a plurality of rank sets and is able to choose between those rank sets. For example, there may be two rank sets called "main" and "beta." The "main" rank set may be, for example, a time-tested, established strategy for scoring documents, and the "beta" rank set may be a new strategy that is being beta-tested. Each of the two rank sets contains ranker objects for all of the relevant document classes (e.g., "site" and "sold-site" in the previous example). Thus, the "main" rank set has formulas for scoring "site" and "sold-site" documents, and the "beta" rank set has different formulas for scoring "site" and "sold-site" documents. The scoring system may select a rank set according to some criteria (e.g., randomly choose ten percent of all searches for the beta-test scoring strategy). Thus, the invention allows new scoring strategies to be tested simply by providing a new rank set, and without having to recompile the underlying scoring software.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 6 is a block diagram of an exemplary score data structure;

FIG. 7 shows an exemplary formula that computes a score based on information contained in a score data structure;

FIG. 8 is a block diagram of data structures that contain plural formulas for computing a score, in accordance with aspects of the invention.

DETAILED DESCRIPTION OF THE INVENTION

Overview

The overwhelming amount of information available in electronic form makes searching a routine part of computer use. Searching generally involves comparing a query to a set of information items (e.g., documents), and scoring each document depending on how closely the document compares to the query. Different scoring strategies are available, and those that exist are continually being refined. The present invention provides a system and method that scores documents for a search, while allowing the particular scoring strategy (i.e., the formula used to compute the score) to be dynamically configured.

Exemplary Computing Environment

Figure 1:
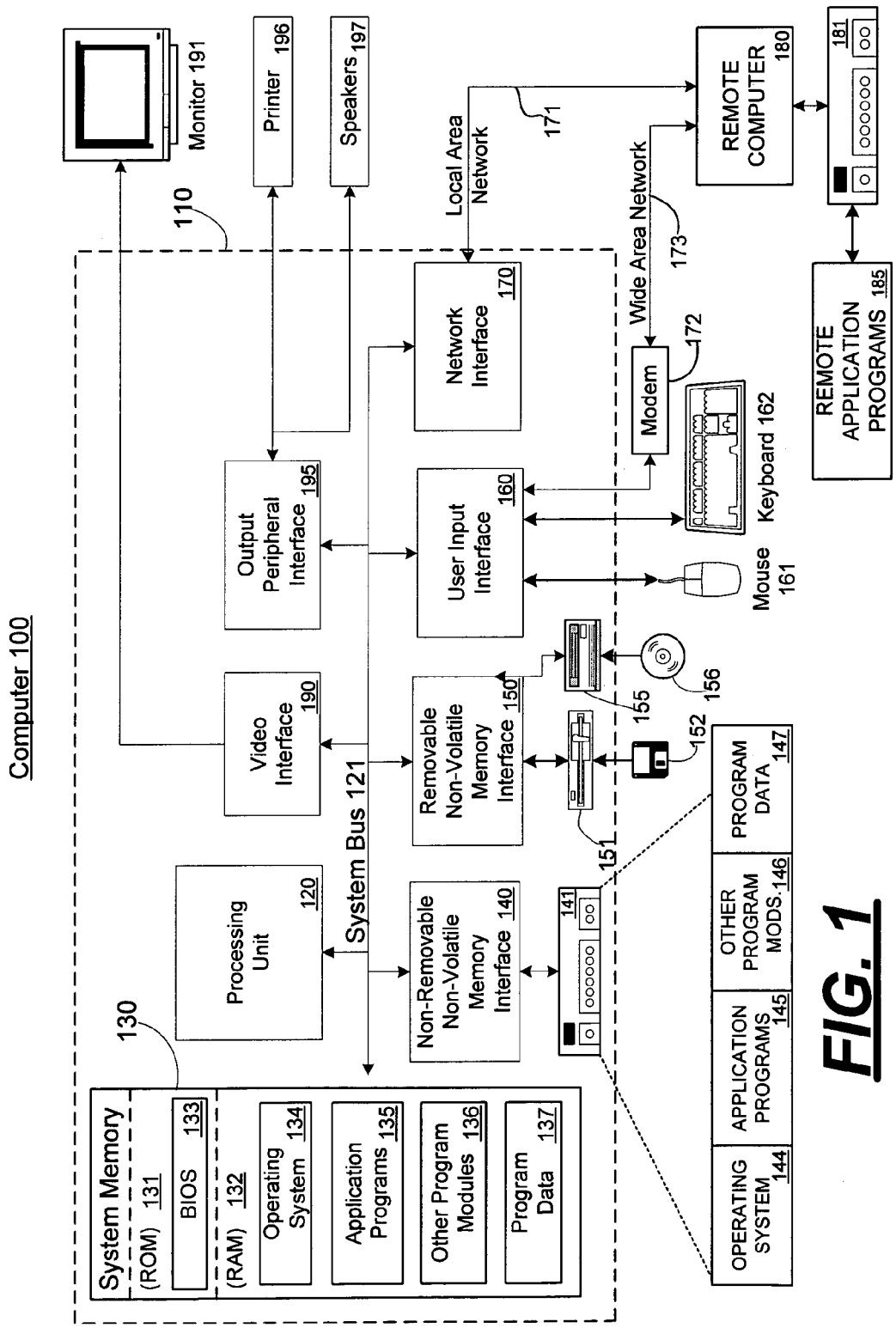
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, supercomputers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Query Processing Environment

Figure 2:
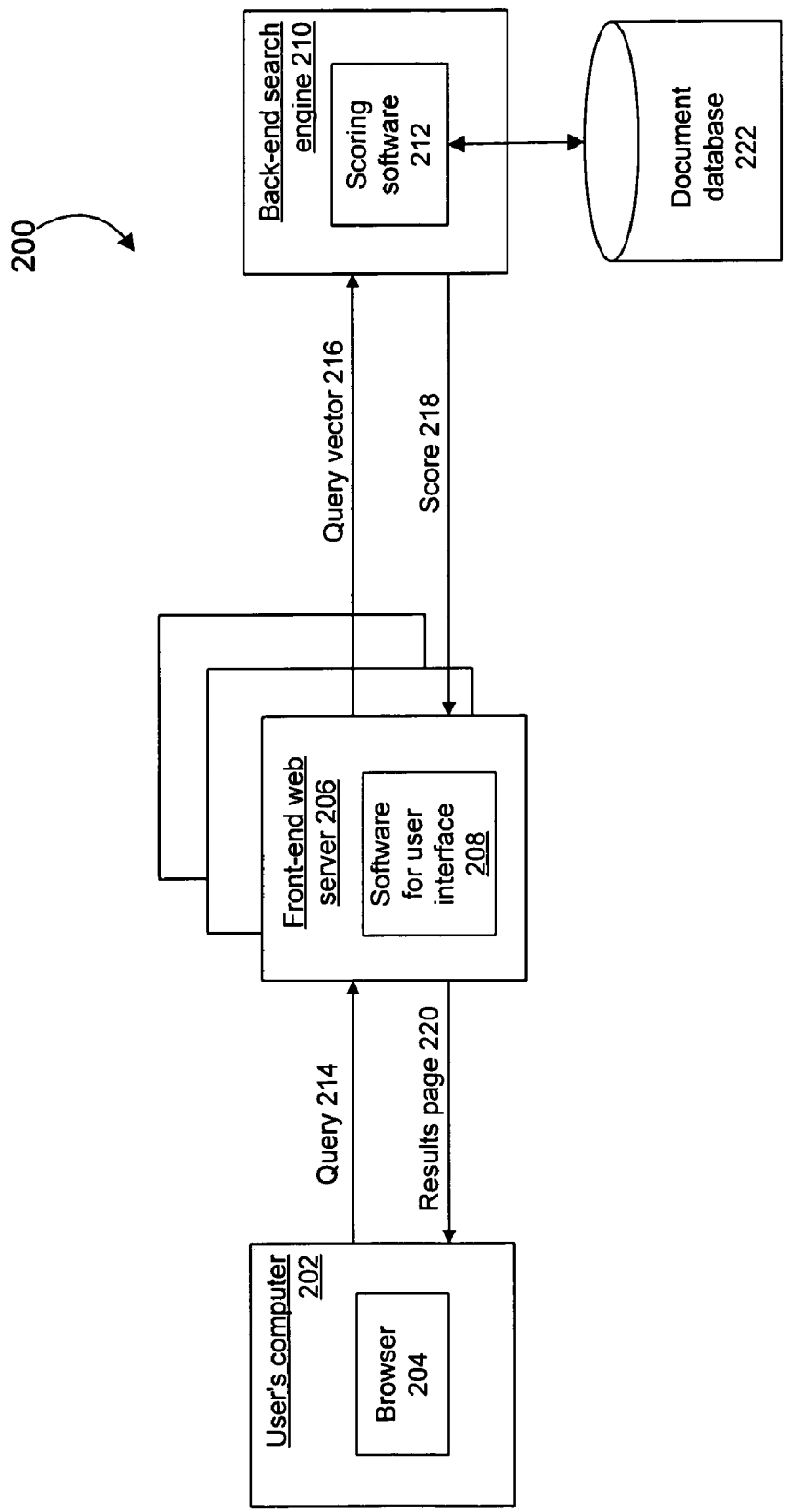
FIG. 2 is a block diagram of an exemplary environment for performing a search in accordance with aspects of the invention.

FIG. 2 shows an exemplary environment 200 for processing a query. Environment 200 includes a user's computer 202, a front-end web server 206, and a back-end search engine 210.

User's computer 202 may, for example, be an instance of computer 110 (shown in FIG. 1). User's computer 202 typically contains software, such as browser 204, which allows a user to view, and interact with, content (e.g., hypertext markup language (HTML) pages) received from a remote source.

Front-end web server 206 is typically a cluster of one or more computers that implement a web site (e.g., a portal site offering search services, such as the msn.com web site). Each of the computers in the cluster may, for example, be an instance of computer 110. Front-end web server 206 typically contains software 208 that implements a user interface. Software 208 generates web pages that are to be sent to user's computer 202 and rendered on browser 204. Software 208 also receives information (e.g., HTML requests, such as GET requests and POST requests) from user's computer 202, and makes processing decisions based on the information received.

Back-end search engine 210 is an entity that performs a search. In an exemplary embodiment, back-end search engine 210 communicates with a document database 222, which stores information about documents. Furthermore, in an exemplary embodiment, back-end search engine 210 contains scoring software 212 that generates "score" information about documents in database 222 in response to a query. (Queries are further discussed below in connection with FIG. 5.) Typically, back-end search engine 210 is a separate machine from the cluster of computers that form front-end web server 206 (i.e., back-end search engine typically is a separate instance of computer 110.) However, the functionality of back-end search engine 210 may reside on front-end web server 206, since there is no requirement that front-end web server 206 and back-end search engine 210 be physically separate machines.

In a typical document search scenario, front-end web server 206 uses user interface software 208 to generate a web page (e.g., an HTML web page), which includes a space for the user to enter a query 214. The query 214 is transmitted to front-end web server 206. In response to receiving the query, front-end web server 206 generates a query vector 216, which is a data structure that represents the content of query 214. (E.g., if query 214 is a string containing a set of search terms, then query vector 216 may contain, among other things, a word-by-word list of the terms found in the string.) Back-end search engine receives query vector 216, and uses scoring software 212 to evaluate how well each document represented in database 222 matches query 214. Scoring software 212 preferably generates a "score" data structure for each document represented in database 222. The "score" data structure is essentially raw data about how a given document compares to query 214; an exemplary score data structure is described below in connection with FIG. 6. (Since database 222 typically represents a very large number of documents, scoring software 212, in some embodiments, may not generate a score data structure for each document, but rather may limit the generation of such a data structure to certain documents—e.g., those documents that have at least one search term in common with query 214.) The score data structure may be used to generate a score 218, which is preferably a scalar quantity on which an order may be defined. Each document's score 218 is transmitted to front-end web server 206. Front-end web server 206 then uses the scores 218 to generate search results. For example, web server may generate a results page 220 (e.g., an HTML page) that contains the Uniform Resource Locators (URLs) of the ten documents with the highest scores. Results page 220 is then transmitted to user's computer 202 for display by browser 204.

In the context of the environment described above, one aspect of the invention provides a system and method that allows the scoring technique to be dynamically configured. Given the raw data contained in a score data structure, there are a variety of algorithms that could be used to compute score 218, and the invention provides a system and method that allows the algorithm to be changed without modifying (or recompiling, or restarting) scoring software 212.

Figure 9:
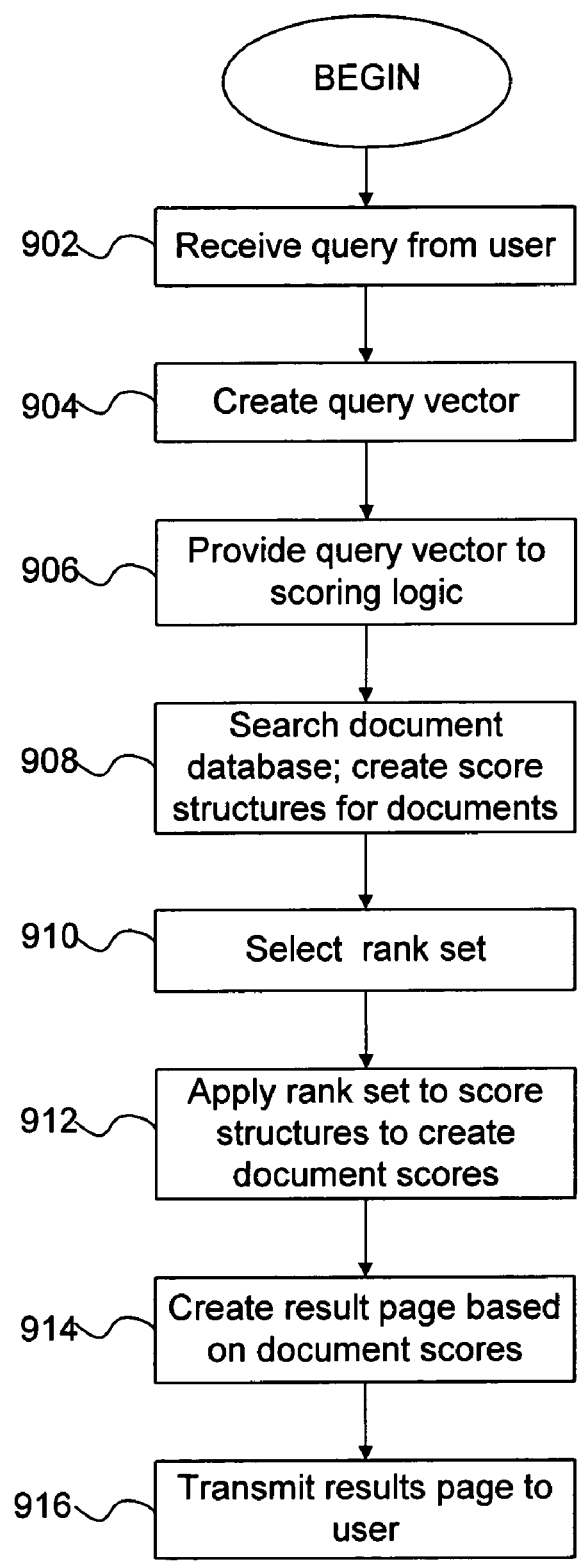
FIG. 9 is a flow diagram of an exemplary method for processing a query, in accordance with aspects of the invention.

FIGS. 2–8, discussed below, show various exemplary components used in the scoring of documents. FIG. 9, discussed below, shows a technique for processing a query by scoring documents in accordance with the present invention.

An Exemplary Document and Its Representation

Figure 3:
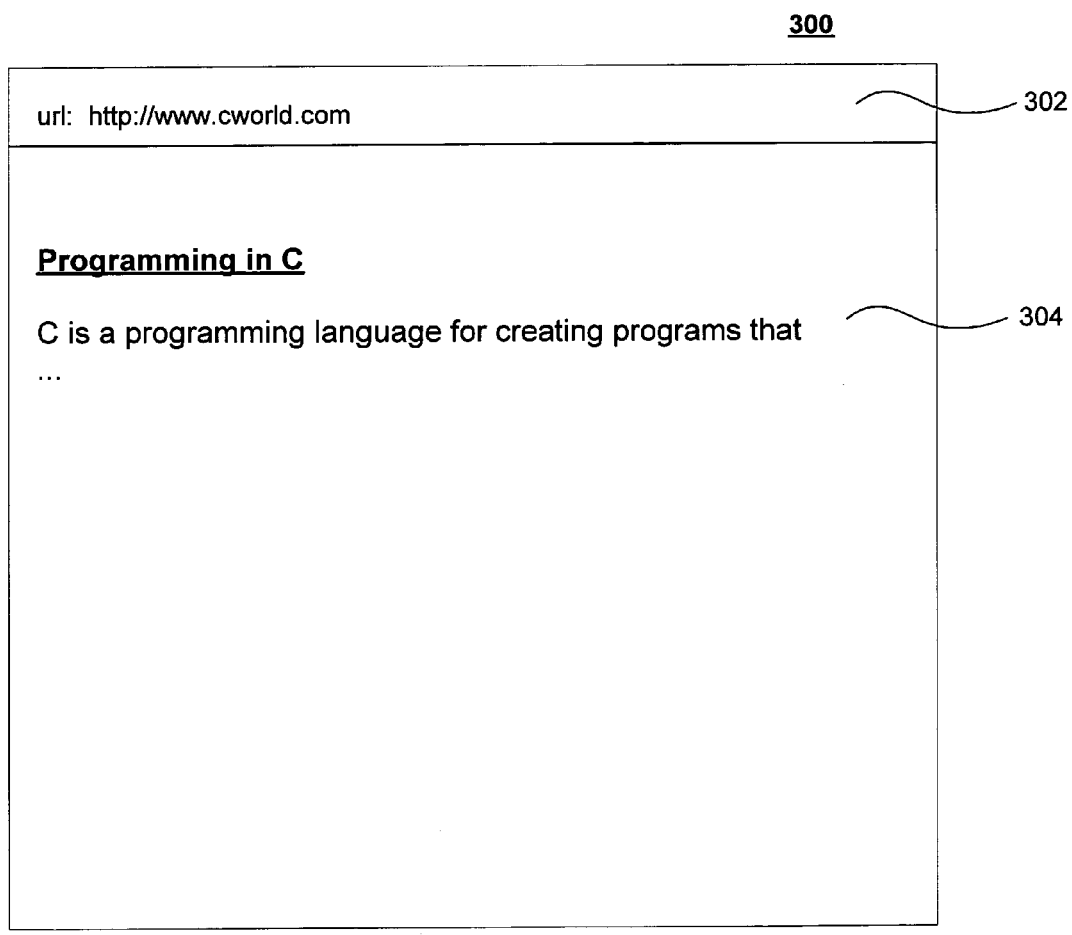
FIG. 3 is a block diagram of an exemplary document.

FIG. 3 shows an exemplary document 300. As discussed above, database 222 (shown in FIG. 2) contains information that represents documents. Document 300 is an example of a document that may be represented in database 222.

Document 300 preferably contains an identifier 302, and content 304. In the example of FIG. 3, identifier 302 is a Uniform Resource Locator (URL), and content 304 is text (preferably structured text delimited by tags, such as in an HTML document). Exemplary document 300 is a document about the C programming language, available at the exemplary web site www.cworld.com. Exemplary document 300 is typical of the kind of document that can be accessed on the World Wide Web; however, it will be understood that a document may be any type of information that can be represented and identified, regardless of whether it is available on the World Wide Web. Music or video files stored on a personal computer, or legal briefs stored in a law firm's document management system, are additional examples of "documents," although it will be understood that these additional examples are hardly exhaustive.

Figure 4:
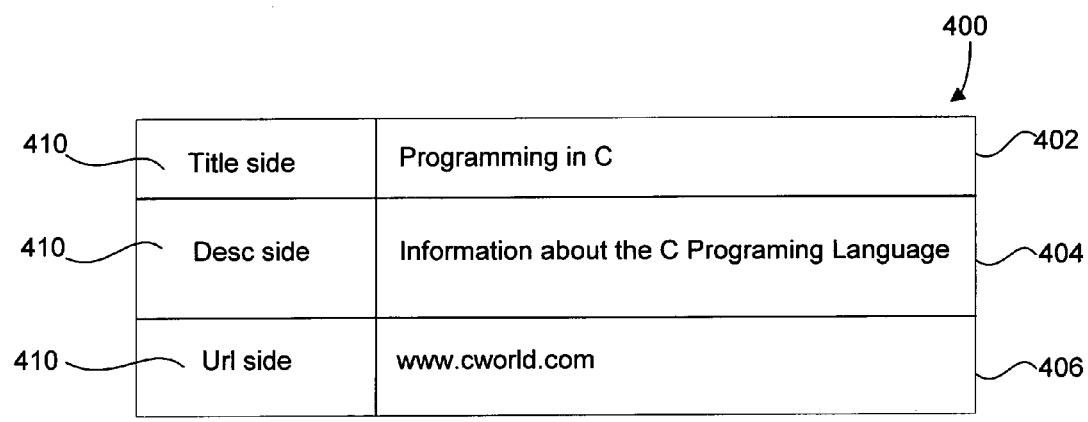
FIG. 4 is a block diagram of an exemplary data structure containing representative information about the document of FIG. 3.

Although database 222 may store copies of actual documents, such as document 300, in a more typical scenario database 222 stores representative information about documents. Storing such representative information is preferable, since database 222 would have to be very large to store entire copies of all the documents that a user may want to search (e.g., every document available on the World Wide Web). FIG. 4 shows an exemplary data structure 400 that contains representative information about document 300.

Exemplary data structure 400 contains a title of document 300, a description of the document, and the document's URL. Data structure 400 stores this representative information in fields 402, 404, and 406. Thus, field 402 contains the title of document 300 ("Programming in C"); field 404 contains a description of document 300 ("Information about the C Programming Language"); and field 406 contains the URL of document 300 ("www.cworld.com"). Each of these fields is sometimes called a "document property" or "DP."

Each of fields 408, 410, and 412 is preferably annotated by a "document class" 410, which indicates what type of document is represented by the data contained in data structure 400. The significance of the document class is that the formula used to compute a score may differ depending on what document class the document is in. In the example of FIG. 4, the document represented by data structure 400 is in the document class "site," which may, for example, be a general category of documents that includes most ordinary sites on the World Wide Web. In contrast, other documents may have the document class "sold-site," which may includes documents that a search engine provider has been paid to generate "hits" on preferentially (e.g., to encourage users to visit those sites). Thus, documents in the class "sold-sites" may be scored under a different formula than documents of class "site," since the "sold-site" formula may be designed to generate slightly higher scores for "sold-site" documents in order to bias the search in favor of those sites. As described in greater detail below, the invention provides a technique for using the document class to determine which scoring formula is applied to a document.

Exemplary Query

Figure 5:
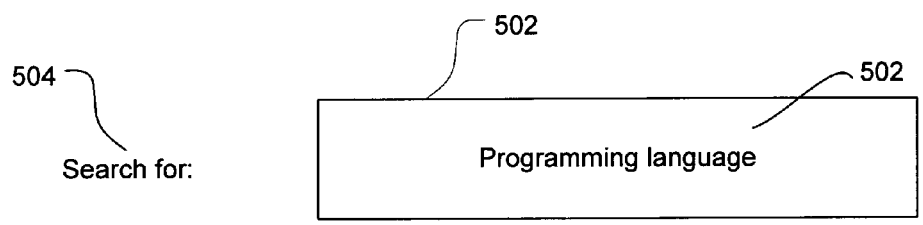
FIG. 5 shows an exemplary query.

FIG. 5 shows an exemplary query 502 for which a document search can be performed. Query 502, in this example, comprises a set of words ("programming languages"). This query may be evaluated in a variety of ways—e.g., search for documents containing the phrase "programming languages," search for documents containing both the word "programming" and the word "languages," search for documents containing either the word "programming" or the word "languages," etc. It will be understood that "query," as used herein, means any phrase, group of words, or other criteria that directs a search against a set of documents. The term "query," as used herein, refers to any information (e.g., a string of search words) against which a collection of information may be searched; the term "query" is not limited to a formal query (e.g., an SQL query) of the type used to direct a search of a relational database.

Typically, query 502 is entered in response to a prompt from a web site that offers a search service. For example, FIG. 5 depicts a portion of a web page containing a prompt 504, and a box 506 into which a user may enter query 502.

Exemplary Score Data Structure

FIG. 6 shows an exemplary score data structure 600. Score data structure 600 contains a list of values 602–612, which describe various aspects of how a given document compares to a query vector. For example value 608 contains the number of "stopwords" from the query that match the document (examples of "stopwords" are "the," "and," or other common words that have limited significance in evaluating a query), and value 606 contains the number of "nonstopwords" from the query that match the document. The counts of stopword matches and nonstopword matches are two different "aspects" of how a document matches a query. As discussed below, the invention provides a technique for applying a formula to these various different aspects (represented by values 602–612) in order to arrive at a scalar score value for a document.

The following is a description of each of the values in score data structure 600. It will be understood that the particular types of values used in score data structure 600 are exemplary. Thus, any types of values, representing any type of comparison between a query vector and a document, can be used in a score data structure without departing from the spirit and scope of the invention.

The values in exemplary score data structure 600 are:
perfect 602—zero or one, depending on whether there was a perfect match between the DP and the query vector.
rarity_index 604—The rarity index of the rarest word match. In a preferred embodiment, words are assigned rarity indices depending on how common they are in English text. Thus, a common words (e.g., "water") may be assigned a low rarity index, while an uncommon word (e.g., "hendiadys"), may be assigned a high rarity index.
Nonstopwords 606—The number of nonstopwords matched. ("Nonstopwords" are explained above.)
Stopwords 608—The number of stopwords matched. ("Stopwords" are explained above.)
Stems 610—The number of stemmed words (i.e., words that match when extended by suffixes such as "-ing," "-ed," etc.
Synonyms 612—The number of words matched that required global synonymy.

Computing a Score from a Score Data Structure

A score may be computed from the various values in a score data structure. A goal of computing a score is to create an orderable scalar value based on the information contained in the score data structure. Thus, while the score data structure preferably contains many values indicating various different types of comparisons between a query vector and a document, the scalar score value is, preferably, a single number in a system on which an order can be defined such that, given two non-equal scores A and B, it is possible to determine whether A is higher than B, or B is higher than A. FIG. 7 shows an exemplary formula that computes a score based on the information in score data structure 600.

Formula 700 indicates that the score is the sum of 0.85 times perfect value 602, plus 0.5 times stopwords value 608, plus multiples of various other values found in the score data structure (these additional addends in the formula are represented by " . . . " in FIG. 7). Thus, the formula for computing a score is based on some determination or judgment about the relative importance of the values contained in the score data structure.

While FIG. 7 shows the score as being a weighted sum of the values contained in score data structure 600, it should be understood that not every score is computed as a simple weighted sum of these values. In greater generality, a score may be computed based on other mathematical functions of values 602–612 (e.g., exponentiation, logarithm, sine, arctangent, product of two or more values 602–612, etc.), or any combination of mathematical functions.

Using a Rank Set to Define a Set of Score Formulas

As described above, a score may be computed by applying a formula to the information in a score data structure. The invention provides a system that allows the formula to be dynamically changed based on circumstance. In particular, the invention provides a "ranker" object, which is essentially a formula of the type shown in FIG. 7, and a "rank set," which is a set of formulas that have been grouped together as described more particularly below.

FIG. 8 shows two rank sets 800, 820. Exemplary rank set 800 has a name 802, and a set of ranker objects 808, 810. Each ranker object is associated with a particular document class 804, 806. Thus, ranker object 808 is associated with the "site" document class, and ranker object 810 is associated with the "sold-site" document class. Rank set 820 likewise has a name and ranker objects. In the example of FIG. 8, rank set 800 is named "main," and rank set 820 is named "beta." These names are merely exemplary, but the reason they have been chosen for this example is described below. Moreover, exemplary rank set 820 has ranker objects for the same document classes as rank set 800 (i.e., "site," "sold-sites," etc.).

As noted above, each of the ranker objects 808, 810 is essentially a formula. The formula can be applied to the information contained in a score data structure 600, in order to compute a scalar score. The reason for using different ranker objects (i.e., different formulas) for different document classes is that the formula may reflect considerations about how a document class should be scored. For example, suppose that documents of class "sold-sites" represent web sites whose operators have paid a search engine provider to direct users to those sites. Thus, the search engine provider may wish to skew the scores of the "sold-sites" documents upward, so that those sites are more likely to appear in the search results provided to the user. Accordingly, given a score data structure 600, ranker object 810 (which is associated with the "sold-sites" document class) may be designed to generate a higher score for that score data structure than ranker object 808 (associated with the "site" document class) would generate for the very same score data structure.

As noted above, FIG. 8 shows two different rank sets 800, and 820. A reason for using two different rank sets is to allow the scoring system to choose dynamically between different scoring strategies. As noted above, rank set 800 is named "main," and rank set 820 is named "beta." In this example, rank set 800 contains the ranker objects that embody the principal scoring formulas to be used for most requests. Rank set 820, on the other hand, contains the ranker objects (i.e., scoring formulas) that are being used for a beta test of a new scoring strategy. Thus, for any given search performed, the scoring system may be configured to choose either rank set 800 or rank set 820 in order to score the documents found under either the regular ("main") strategy, or the strategy being beta-tested. For example, the scoring system may be configured to score most search requests using the main strategy (rank set 800), but to randomly score ten percent of all search requests using the beta strategy (rank set 820).

It should be understood that beta-testing a scoring strategy is only one example of a situation in which it may be useful to use plural rank sets. Moreover, the invention is not limited to the case where there are only two rank sets; rather, any number of rank sets may be available to the scoring system.

Thus, the organization of ranker objects into rank sets, and the ability of the scoring system to apply different rank sets to different searches, allows the scoring strategy to be changed dynamically.

Exemplary Method of Processing a Query

FIG. 9 shows an exemplary method of processing a query in an environment where the scoring strategy is dynamically configurable.

At step 902, a query is received from a user. For example, a user may use browser 204 (shown in FIG. 2) to enter a query into an interactive web page, and this query may be transmitted to web server 206. In one example, the query takes the form of a search string (as shown by query 502 in FIG. 5), entered in response to a prompt 504 that appears on a web page. However, it will be understood that the query received at step 902 may take any form, and may be provided in any manner, without departing from the spirit and scope of the invention.

At step 904, a query vector (e.g., query vector 216, shown in FIG. 2) is created based on the query received at step 902. As described above, the query vector is a structured representation of a query—e.g., a data structure that contains the individual terms to be searched, and, preferably, the relationship between those terms (e.g., whether the terms are joined by an "AND" operator, an "OR" operator, etc.). In is technically possible to evaluate the query in the form in which it is entered—i.e., without creating a query vector. However, the query vector created at step 904 is a representation of the query that is useful for processing, although representing the query in this manner is optional.

At step 906, the query vector is provided to the scoring logic. In FIG. 2, the scoring logic (reference numeral 212) is embodied at back-end search engine 210, which, in the example of FIG. 2, is a separate computer from the front-end web server cluster that received the query. However, it will be understood that the actual architecture depicted in FIG. 2 is optional. For example, scoring logic 212 may reside on the same computer (or computer cluster) that functions as a front end web server. The scoring logic may be located anywhere, and may receive the query vector in any manner, without departing from the spirit and scope of the invention.

At step 908, the document database (e.g., document database 222) is searched to find documents that match the query vector. For each document located, a score data structure is created. Preferably, score data structures are created only for those documents that are "hits" against the database—that is, documents that match the query vector in at least some aspect. However, alternatively it is possible to create a score data structure for each document in the database, although this technique would result in the creation (and transmission) of many score data structures for documents that have no relevance to the query that the user submitted.

At step 910, a rank set is selected in order to generate scalar scores based on the score data structures. The actual selection may be performed in any manner, and according to any criteria. As discussed above in connection with FIG. 8, one example is where the system uses a "main" rank set to respond to most queries, but uses a rank set that is being tested ("beta," in the example of FIG. 8) for a small proportion of the queries. In this example, the selection of a rank set may comprise generating a random number and choosing a rank set based on what number is generated. However, it will be understood that the selection of a rank set is not limited to the case where there are two rank sets, or where a rank set is being beta tested, or where the rank set is chosen at random. On the contrary, the rank set may be chosen in any manner without departing from the spirit and scope of the invention.

At step 912, the selected rank set is applied to the score data structures in order to generate scalar scores. Thus, the formula embodied in one of the ranker objects contained in the rank set is applied to the values contained in the score data structure. The result of step 912 is preferably a scalar score for each document.

As described above, each rank set may contain several ranker objects, where each ranker object applies to a different document class. The actual ranker object used to compute the scalar score depends on the document class of the document to which a given score data structure pertains. Thus, in order to apply a rank set to a score data structure, a system that performs step 912 typically determines the class of the document from which the score data structure is derived, and then looks up, in the selected rank set, the ranker object that applies to that document class.

At step 914, a results page (e.g., results page 220, shown in FIG. 2) is created based on the document scores. For example, a page may be created that shows a list of documents in descending order of score—i.e., with the highest-scoring document being shown first in the list. In the example of FIG. 2, user interface software 208 creates an HTML page containing the results (e.g., page 220). However, it will be understood that the results page created at step 914 need not be an HTML page, but rather may take any form without departing from the spirit and scope of the invention.

At step 916, the results page created at step 914 is transmitted to the user. In the example of FIG. 2, the results page is transmitted over the Internet for display on browser 204. However, it will be understood that the results of a search may be transmitted in other manners.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of providing search results in response to a query comprising:
   comparing the query to either: (a) a plurality of documents, or (b) information representative of said plurality of documents;
   creating, for at least one of said documents, a score data structure which comprises a plurality of fields of information containing numerical values regarding a plurality of aspects of how said at least one document compares to the query, said plurality of aspects including at least one of the following aspects: whether there was a perfect match in the comparison, a rarity of a word in a match of the comparison, a number of common words that have limited significance in evaluating a query that were matches in the comparison, a number of words that have greater significance in evaluating a query that were matches in the comparison, a number of words that when extended by particular suffixes were matches in the comparison, and a number of words that required global synonymy that were matches in the comparison;
   selecting, based on a function, a first rank set from a plurality of rank sets, wherein each of the rank sets comprises a plurality of formulas that compute scalar scores based on score data structures;
   computing a scalar score for said at least one document by applying one of the plurality of formulas in said first rank set to said score data structure;
   providing information to a user based at least in part on the computed scalar score wherein each of said plurality of documents has an assigned class, wherein each of said plurality of formulas is associated with a class; and
   selecting said one of said plurality of formulas based on said formula being associated with the same class to which said at least one document is assigned.

2. The method of claim 1, wherein said function randomly selects one of said plurality of rank sets.

3. The method of claim 1, wherein said plurality of rank sets includes at least said first rank set and a second rank set, said first rank set representing a primary scoring strategy and said second rank set representing a scoring strategy that is being tested, and wherein said function selects a proportion of searches to be computed using said second rank set.

4. The method of claim 1, wherein each of said plurality of formulas computes said scalar score as a weighted total of said plurality of fields.

5. The method of claim 1, wherein at least one of said plurality of formulas computes said scalar score as a mathematical function of said plurality of fields.

6. The method of claim 1, wherein said act of providing information to said user comprises:
   generating a Hypertext Markup Language (HTML) page comprising an identification of said at least one document.

7. The method of claim 6, further comprising:
   transmitting said Hypertext Markup Language (HTML) page to a computer associated with said user.

8. A system for producing search results from a query, the system comprising:
   a database that stores information indicative of a plurality of documents;
   scoring logic that compares the query to at least one of the documents and that produces score information indicative of a comparison between the query and the at least one document regarding a plurality of aspects of how said sat least one document compares to the query, said scoring logic being adapted to compute a scalar score based on said score information by applying a ranker object to said score information and said plurality of aspects including at least one of the following aspects: whether there was a perfect match in the comparison, a rarity of a word in a match of the comparison, a number of common words that have limited significance in evaluating a query that were matches in the comparison, a number of words that have greater significance in evaluating a query that were matches in the comparison, a number of words that when extended by particular suffixes were matches in the comparison, and a number of words that required global synonymy that were matches in the comparison; and
   a first plurality of ranker objects, each of the plurality of ranker objects being indicative of a formula that produces a scalar score based on the score information, each of the first plurality of ranker objects being accessible to said scoring logic and being createable independently of said scoring logic,
   wherein said scoring logic is adapted to select a ranker object from among said first plurality of ranker objects to be applied to said score information,
   wherein each of the plurality of ranker objects is associated with a class, and wherein said scoring logic selects a ranker object based on the class of said at least one document.

9. The system of claim 8, further comprising:
   a plurality of rank sets, each rank set including a plurality of ranker objects, one of the rank sets comprising said first plurality of ranker objects,
   wherein said scoring logic selects a rank set according to a first function and selects a ranker object to be applied to said score information from the selected rank set.

10. The system of claim 8, wherein the score information comprises a plurality of values, each of the values being indicative of an aspect of a comparison between the query and said at least one of the documents.

11. The system of claim 10, wherein the formula indicated by one of the first plurality of ranker objects comprises multiplying each of the values by a constant to produce a plurality of products, and adding said products together to produce said scalar score.

12. The system of claim 10, wherein the formula indicated by one of the first plurality of ranker objects comprises a mathematical function of said values.

13. A computer-readable medium having computer executable instructions to perform a method of producing search results from a query, the method comprising:
   receiving data indicative of a comparison between the query and a document regarding a plurality of aspects of how said sat least one document compares to the query, said plurality of aspects including at least one of the following aspects: whether there was a perfect match in the comparison, a rarity of a word in a match of the comparison, a number of common words that have limited significance in evaluating a query that were matches in the comparison, a number of words that have greater significance in evaluating a query that were matches in the comparison, a number of words that when extended by particular suffixes were matches in the comparison, and a number of words that required global synonymy that were matches in the comparison;

selecting an object from among a first plurality of objects, wherein said document is associated with a predetermined class, and wherein said selecting act comprises selecting said object based on the class with which said document is associated;

applying said object to said data to compute a scalar score for said document, said object indicating a formula to be applied to said data, said object being createable independently of the computer-executable instructions;

creating search results based on said scalar score and wherein the computer-executable instructions are executable on a first computer; and transmitting information including the scalar score to a second computer different from said first computer.

14. A computer-readable medium having stored thereon a data structure having a plurality of items, the items comprising:

an identifier that identifies the data structure, said data structure regarding a plurality of aspects of how at least one document compares to a query, said plurality of aspects including at least one of the following aspects: whether there was a perfect match in the comparison, a rarity of a word in a match of the comparison, a number of common words that have limited significance in evaluating a query that were matches in the comparison, a number of words that have greater significance in evaluating a query that were matches in the comparison, a number of words that when extended by particular suffixes were matches in the comparison, and a number of words that required global synonymy that were matches in the comparison; and a plurality of ranker objects, each ranker object being associated with one of a plurality of classes of documents, each ranker object specifying a formula to be applied to a predetermined set of values in order to produce a scalar score, each ranker object being selectable based on a class of documents to be compared with a query wherein said identifier is a name associated with the data structure, wherein the formula specified by at least one of the ranker objects computes said scalar score as a weighted sum of said values, and wherein the formula specified by at least one of the ranker objects computes said scalar score as a mathematical function of said values.

* * * * *